Figure 1:
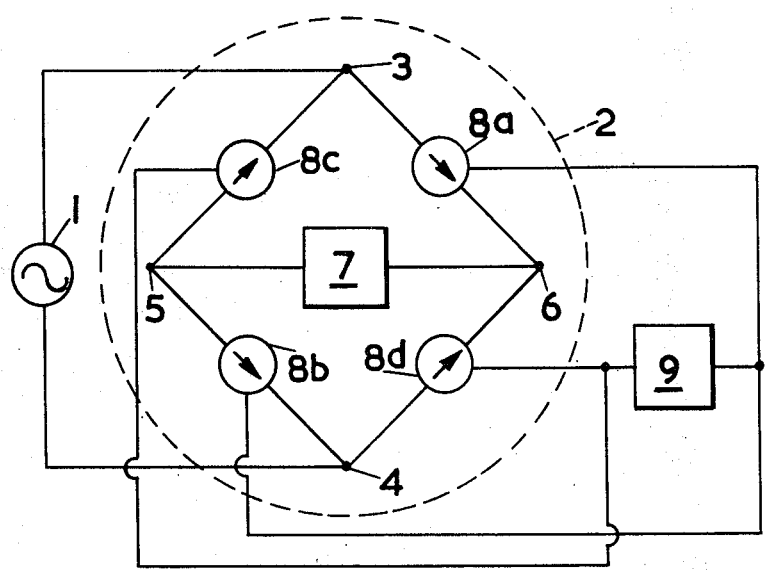

United States Patent [19]

Irish

[11] 3,959,709

[45] May 25, 1976

[54] MULTI-PHASE POWER SUPPLIES

[75] Inventor: Reginald Tom Irish, Shrivenham, England

[73] Assignee: British Secretary of State for Defence, London, England

[22] Filed: Oct. 18, 1974

[21] Appl. No.: 515,955

[30] Foreign Application Priority Data

Oct. 19, 1973 United Kingdom............ 48909/73

[52] U.S. Cl..................................... 321/7; 321/59
[51] Int. Cl.² ...................................... H02M 5/14
[58] Field of Search .................. 321/7, 56, 58, 59

[56] References Cited
UNITED STATES PATENTS

| | | | |
|---|---|---|---|
| 1,985,735 | 12/1934 | Macalpine | 321/59 X |
| 2,776,401 | 1/1957 | Sommeria | 321/56 X |
| 3,178,630 | 4/1965 | Jessee | 321/58 X |
| 3,328,660 | 6/1967 | Dunbar | 321/56 X |
| 3,368,136 | 2/1968 | Krabbe | 321/7 |
| 3,786,335 | 1/1974 | Phillips et al. | 321/7 X |

Primary Examiner—William M. Shoop
Attorney, Agent, or Firm—Elliott I. Pollock

[57] ABSTRACT

Apparatus for converting a single-phase power supply to multi-phase operation in which at least one phase of the multi-phase supply is generated by applying the single-phase to the input of a bridge network, each arm of which contains at least one switch device controlled by external circuitry to give an output waveform from the bridge network which contains a fundamental component of the single phase which is out of phase with the single phase by a predetermined phase angle. The output waveform may be filtered to eliminate unwanted harmonics.

11 Claims, 9 Drawing Figures

MULTI-PHASE POWER SUPPLIES

This invention relates to multi-phase power supplies.

The invention is particularly concerned with equipment used to convert single-phase a.c. power supplies to multi-phase power supplies to enable a multi-phase machine — e.g. a multi-phase induction motor — to be run from a single-phase power supply. At present, such equipment ranges from relatively straightforward capacitor-type systems to fairly sophisticated and costly rotary conversion systems.

According to the invention, an apparatus for converting an a.c. power supply having a single-phase to a power supply having a plurality of phases is characterized in that at least one of said plurality of phases is derived from the single-phase by applying the single-phase to the input of a bridge network, each arm of which contains at least one switch device controlled in a predetermined manner by electrical switching circuitry external to the bridge network to give an output from the bridge network which contains a fundamental component of the simple-phase which is out of phase with the single-phae by a predetermined phase angle.

In operation, the switched devices are controlled by the external electrcal switching circuitry to be non-conducting or conducting in either or both directions during each of four predetermined periods in each sine wave cycle to give a chosen output waveform from the bridge network which is cyclic with the same frequency as the single phase and wherein each cycle is entirely composed of two predetermined periods of the single phase sine wave cycle alternating with two predetermined periods of its corresponding negative sine wave cycle. The output waveform from the bridge network may be considered to wholly composed of a number of sine waves, each sine wave having a frequency which is equal to or is a multiple of the frequency of the single-phase sine wave and being shifted by a phase angle from the single-phase sine wave. It is arranged that the frequency of the fundamental sine wave of the output waveform is equal to the frequency of the single-phase sine wave and that the number of other sine waves, which in combination with the fundamental sine wave make up the output waveform from the bridge circuit, is kept to a minimum. The phase angle by which the fundamental sine wave is shifted from the single-phase sine wave may be set to any desired value by altering the timing of the controls issued by the external electrical switching circuitry.

The invention, which can be used to convert a single-phase power supply to a power supply having two or more phases, is particularly useful for providing a three phase power supply. In its most convenient and preferred form, the single-phase power supply is used without phase conversion to provide one of the plurality of phases and the remaining phases are derived from bridge networks using the method herein described. In such a preferred form, it is necessary to compensate for the fact that the amplitude of the single-phase which is used without conversion is greater than the amplitudes of the remaining phases. Compensation may be achieved, for example, either by transforming the single-phase to the required amplitude or by having an unbalanced load.

The switch devices used in the bridge circuit may be mechanical — eg reed switches — but they are preferably electrical and may be either valves or semiconductor switch devices such as transistors, triacs or silicon-controlled rectifiers. If a phase derived from a bridge network as herein described is used to drive a purely resistive load, it is sufficient to have one uni-directional semiconductor switch devce — eg a silicon controlled rectifier —in each arm of the bridge circuit. If, however, the phase is used to drive a capacitive or inductive load — eg an electric motor — when currents may have to be maintained in either direction through each arm of the bridge network, it may be necessary for each arm of the bridge network to contain either a bi-directional semiconductor switch device — e.g. a triac — or two uni-directional semiconductor switch devices wired in parallel.

The electrical switching circuit, which is external to the bridge network and which is used to control the semiconductor switch devices in the required predetermined manner, may be of any suitable type. In a preferred embodiment of the invention in which the semiconductor switch devices are silicon controlled rectifiers, they are switched to a conducting state and maintained in that state for as long an interval as is required by applying a series of pulses to their gates continuously during the said interval. In this preferred embodiment, commutation of the silicon controlled rectifiers is achieved by reverse pulsing through a transformer, but most commutation methods are suitable - for example see SCR manual GEC 5th Edition, 1972 p. 127 et seq.

The output waveform from a bridge network as defined herein may be considered to contain a number of sine waves which have frequencies which are multiples of the frequency of the single-phase sine wave. These may cause overheating and noise problems when the output waveform is used for motor supplies and it may be necessary to reduce their content or eliminate them completely from the output waveform by usng filters.

Figure 4:
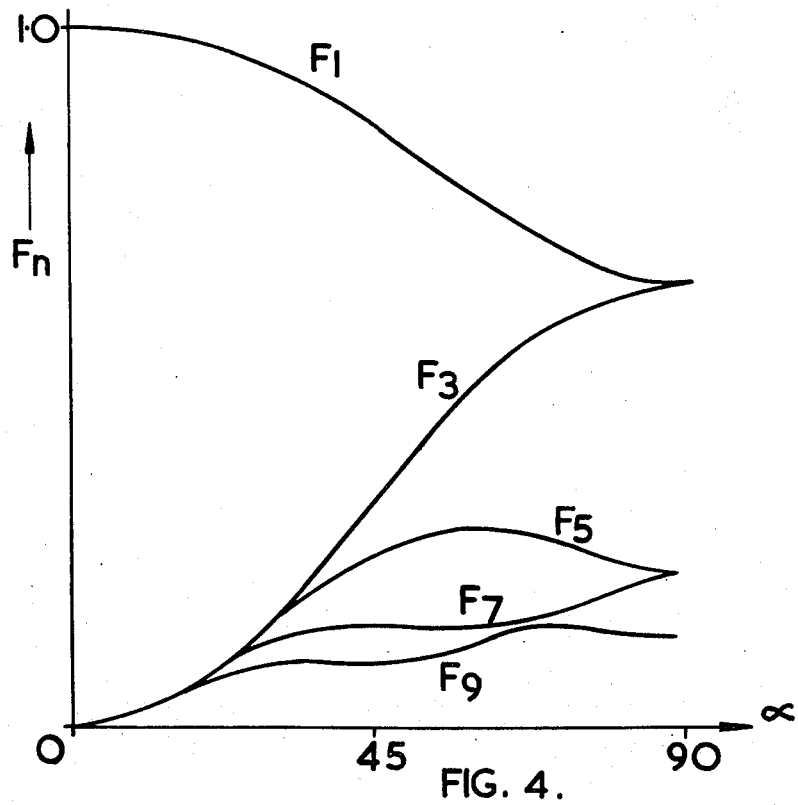
Figure 8:
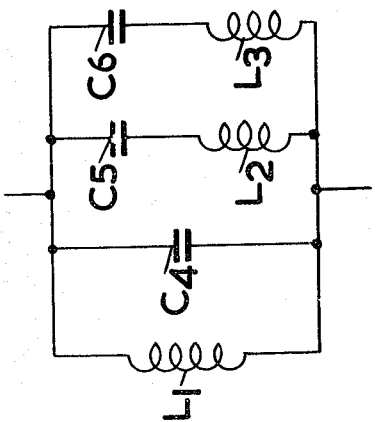
Figure 2:
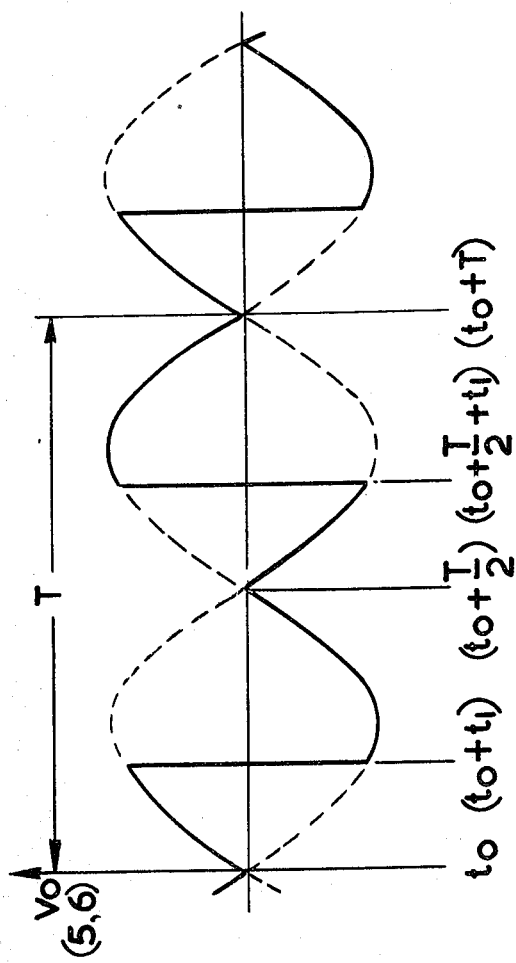
Figure 3:
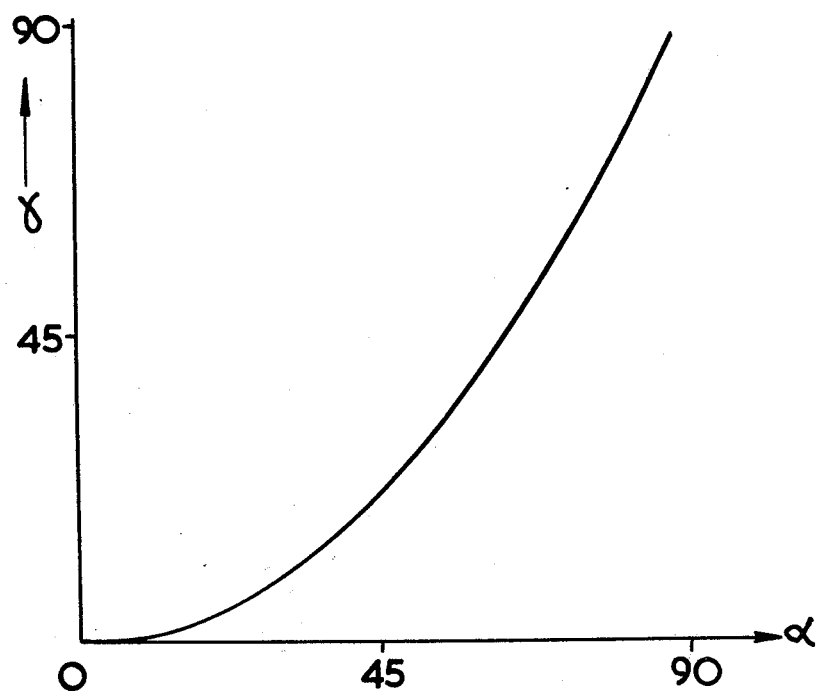
Figure 5:
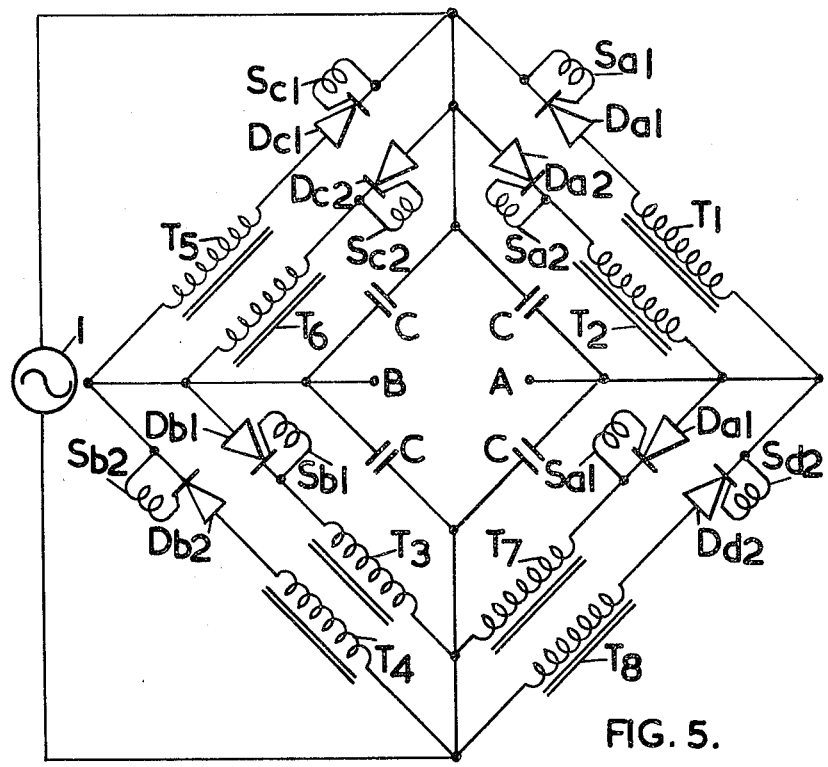
Figure 6:
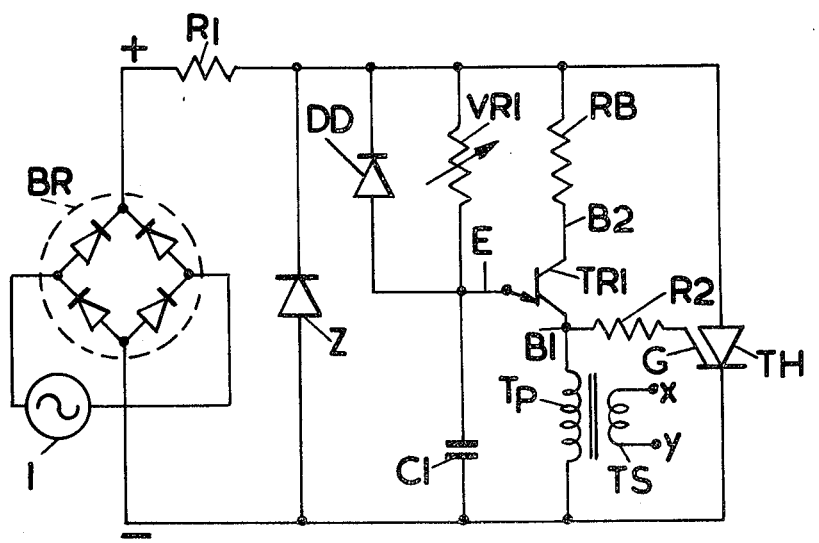
Figure 7:
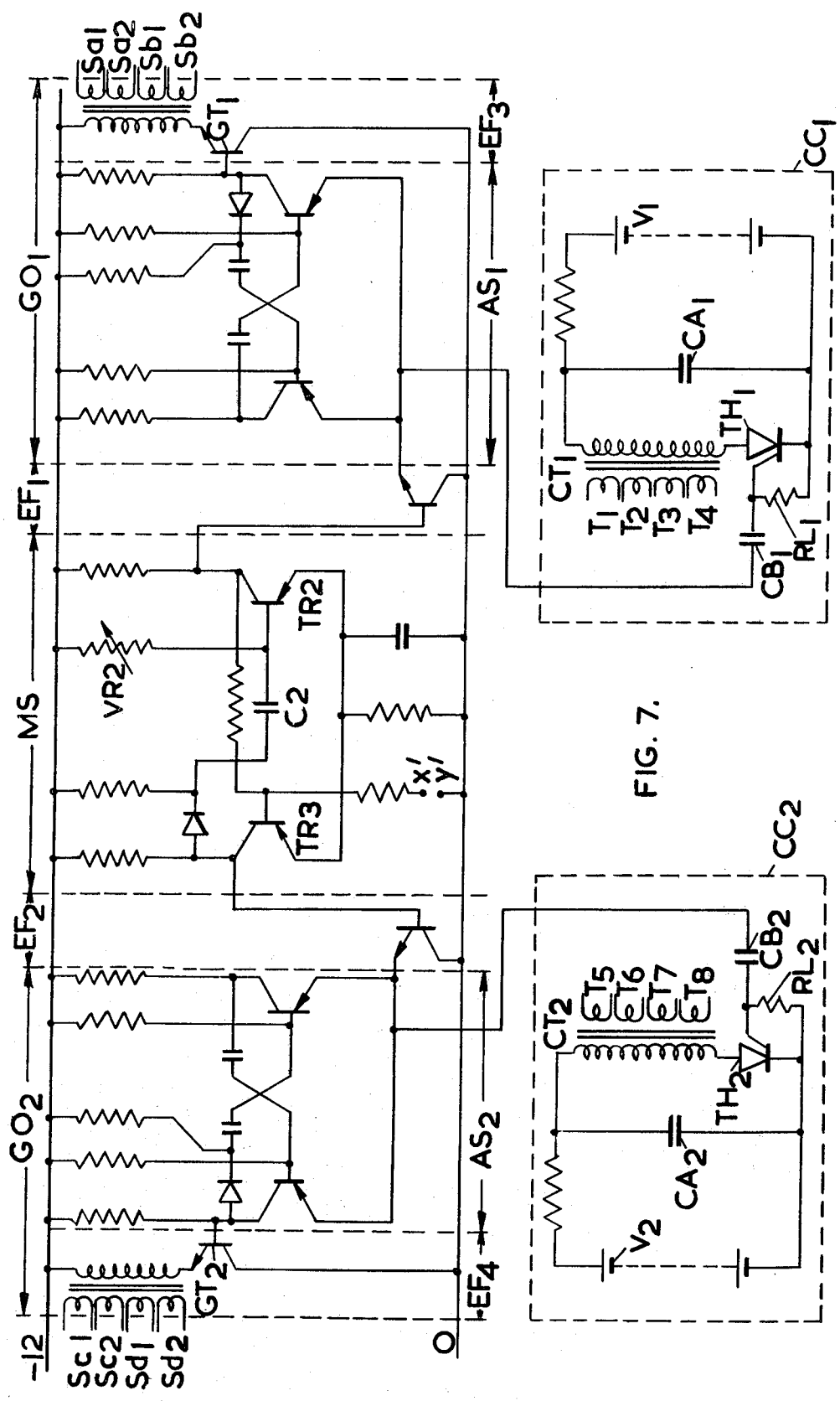
Figure 9:
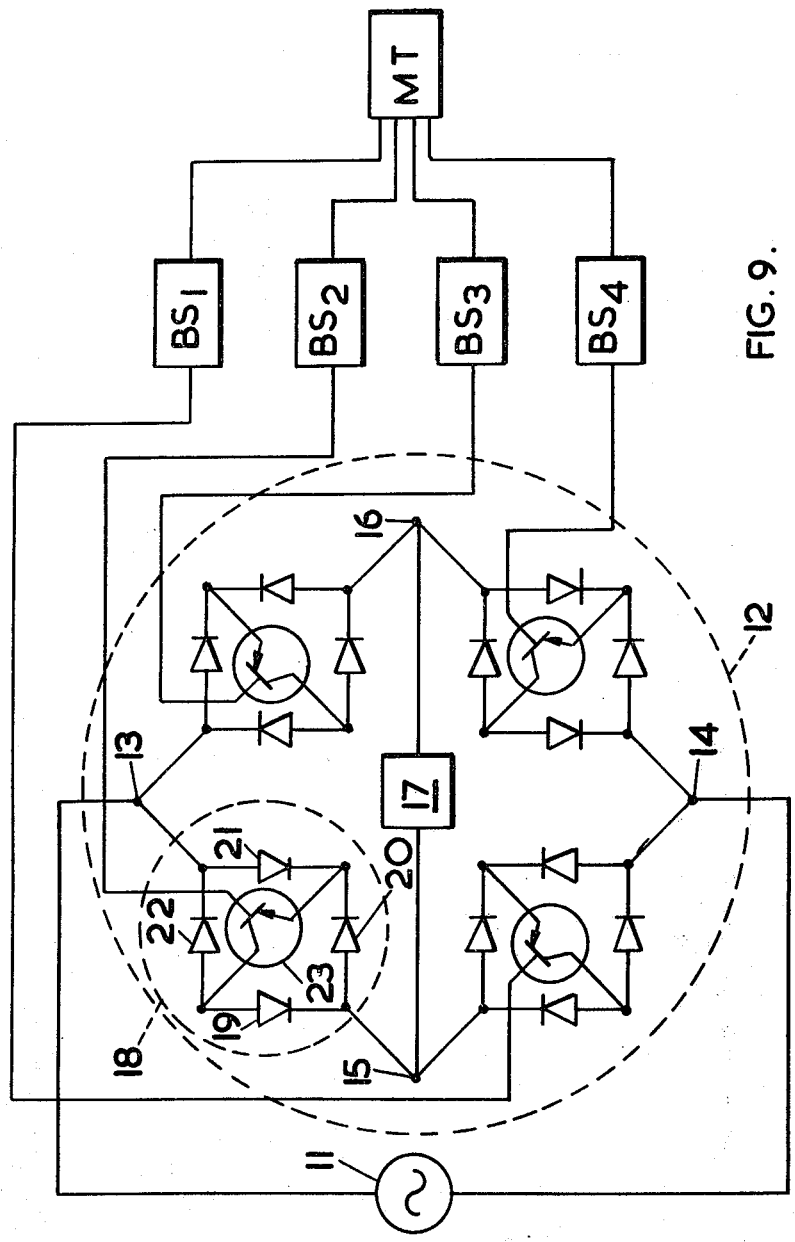

The invention will be further explained, by way of example only, with reference to the accompanying drawings in which:

FIG. 1 shows an example of a bridge network as defined herein,

FIG. 2 shows an output waveform from the bridge network of FIG. 1 together with the waveform of the single-phase which drives the bridge and its inverse, FIG. 3 is a graph of the phase lag of the output waveform of FIG. 2 versus the angle in relation to the single-phase at which the bridge is switched, FIG. 4 illustrates the relationship between the amplitudes of both the fundamental component and the harmonics of the waveform of FIG. 2 and the angle in relation to the single-phase at which the bridge is switched, FIGS. 5, 6 and 7 illustrate the electrical circuitry of apparatus according to the invention, which can be used to provide ne of the phases required to drive e.g. — a multi-phase electric motor, FIG. 8 shows a filter suitable for eliminating some of the harmonics contained in an output wave form as shown in FIG. 2, and FIG. 9 illustrates a further example of electrical apparatus, according to the invention, which can be used to provide one phase of a multi-phase supply.

Referring to FIG. 1, a single-phase 1 is connected across one pair of opposite terminals 3 and 4 of a bridge network 2 and the other pair of opposite terminals 5 and 6 of the bridge network 2 are connected to a resistive load 7. Each arm of the bridge network 2 contains a semiconductor switch device 8. The semiconductor switches 8a, 8b, 8c and 8d can be either in a state in which they conduct in the direction shown by the arrows or in a non-conducting state and they are controlled in pairs 8a and 8b, 8c and 8d by the external electrical switching circuitry 9.

At the beginning $t_o$ of a cycle T of the single-phase 1, the switching circuitry 9 holds the semiconductor switch devices 8a and 8b in a conducting state and the semiconductor switch devices 8c and 8d in a non-conducting state and the bridge network output waveform $V_o$ is as shown in FIG. 2. At a predetermined time $t_o + t$, the switching circuitry 9 causes the devices 8a and 8b to assume a non-conducting state and, momentarily afterwards, the devices 8c and 8d to assume a conducting state, resulting in a change of polarity in the output waveform $V_o$. When the half cycle point is reached at a time $t_o + (T/2)$; the switching circutry 9 causes the devices 8 to change state once again and the output waveform $V_o$ reverts to following the single-phase 1.

The switching circuitry 9 is programmed to cause the devices 8 further changes of state at times $t_o + (T/2) + t_1$ and $t_o + T$ to give a complete cycle of the output waveform $V_o$ which repeats with the same frequency 1/T as the single-phase 1. The angle $$\alpha = \frac{2\pi t_1}{T}$$

is defined to be the triggering angle.

The output waveform $V_o$ may be represented by a Fourier series $f(t)$ given by:

$$f(t) = \sum_{n=1}^{n=\infty} \left[ a_n \cos\left(\frac{2\pi nt}{T}\right) + b_n \sin\left(\frac{2\pi nt}{T}\right) \right]$$

where $a_1 = \frac{\hat{V}}{\pi}[\cos 2\alpha - 1]$ $b_1 = \frac{\hat{V}}{\pi}[\pi - 2\alpha + \sin 2\alpha]$ $a_n = \frac{2\hat{V}}{\pi} \left( \frac{1}{n-1}(1 - \cos(n-1)\alpha) - \frac{1}{n+1}(1 - \cos(n-1)\alpha) \right)$ $b_n = \frac{2\hat{V}}{\pi} \left( \frac{1}{n+1}\sin(n+1)\alpha - \frac{1}{n-1}\sin(n-1)\alpha \right)$ when $n \geq 3$ and odd The fundamental component of the output waveform $V_o$ is $F_1 = a_1 \cos(2\pi t/T) + b_1 \sin(2\pi t/T)$ which may be written $\sqrt{a_1^2 + b_1^2} \sin([2\pi t/T] + \gamma)$, where $\gamma = \tan^{-1}(a_1/b_1)$. This fundamental sinusoidal component has the same frequency 1/T as the single-phase and lags the single-phase by an angle $\gamma$. A graph of the phase angle $\gamma$ versus the triggering angle $\alpha$ is shown in FIG. 3 and a graph of the amplitudes of the fundamental sinusoidal component and the lowest harmonics $F_n$ versus the trigger angle $\alpha$ is shown in FIG. 4.

A bridge network suitable for providing one of the phases used to drive a multi-phase electric motor is shown in FIG. 5. Each arm of the brige comprises a parallel arrangement of a capacitor C and two back-to-back silicon controlled rectifiers D, each rectifier D being wired in series with a transformer winding T. The silicon controlled recifiers D are arranged to be controlled in two groups of four — namely ($D_{A1}$ $D_{A2}$ $D_{b1}$ $D_{b2}$) and ($D_{c1}$ $D_{c2}$ $D_{d1}$ $D_{d2}$).

Referring to FIG. 6, a unijunction transistor circuit is used to provide the necessary delay to establish the required triggering angle. The single-phase 1 drives a conventional full wave bridge rectifier BR and the resultant full wave rectified output is connected across a resistor R1 wired in series with a Zener diode Z which is chosen to conduct at a voltage considerably less than the amplitude of the waveform of the single-phase 1. A unijunction transistor TR1 is wired in parallel with the Zener diode Z and has a first base B1 connected through a transformer primary coil TP to the negative terminal of the rectifier BR and a second base B2 connected through a current limiting resistor RB to the common connection of the resistor R1 and the Zener diode Z. The first base B1 is also connected via a resistor R2 to the gate G of a thyristor TH which has its anode connected to the common connection of the resistor R1 and the Zener diode Z and its cathode connected to the negative terminal of the bridge rectifier BR. The emitter E of the unijunction transistor TR1 is connected to the negative terminal of the bridge rectifier BR via a capacitor C1 and to the common connection of the resistor R1 and the Zener diode Z via a parallel combination of a diode DD and a variable resistor VR1.

In operation, as the half-cycle sine wave output rises in voltage from zero, it very quickly reaches the value Vz at which the Zener diode conducts. At this point, the voltage across the Zener diode stabilizes at Vz. The capacitor C1 charges up through VR1 with time constant (C1 × VR1) until the potential difference across it is sufficient to turn on the unijunction transistor TR1, at which time a current tries to flow through the unijunction transistor TR1 and the transformer primary coil TP. A back emf is induced across the coil TP to prevent this flow of current and this back emf, connected via the resistor R2 to the gate G of the thryistor TH, is sufficient to turn the thyristor TH on. The thyristor TH conducts and the voltage Vz across the Zener diode Z falls to zero, causing the capacitor C1 to discharge through the diode DD and the thyristor TH, and the back emf across the coil TP to decay rapidly to zero.

The thyristor TH continues to conduct until the voltage output from the bridge rectifier falls to zero again, at which point the unijunction transistor circuit is ready to respond in identical manner to the following halfcycle.

A transformer secondary coil TS having terminals X and Y is inductively wound with the transformer primary coil TP and a back emf "spike" which appears across the coil TP is transmitted inductively to the coil TS. Thus the output between the terminals X and Y is a series of "spikes" having a frequency equal to twice the frequency of the single-phase sinewave and being delayed from the zero points of the single-phase sine wave by a time determined by the value of the variable resistor VR1.

The output terminals X and Y of the unijunction transistor circuit are connected to terminals $X^1$ and $Y^1$ of a conventional monostable multivibrator MS, shown in FIG. 7. The monostable multivibrator MS has a stable state in which a transistor TR2 conducts and a transistor TR3 is switched off, and an unstable state in which the transistor TR2 is switched off and the transistor TR3 conducts. The monostable multivibrator MS is triggered from its stable state to its unstable state by the application of a "spike" from the coil TS and returns to its stable state after a time determined by the discharge of a capacitor C2 through a variable resistor VR2. The variable resistor VR2 is adjusted so that the monostable MS returns to its stable state at the same time as the half-wave sine wave output from the bridge rectifier BR returns to zero.

The transistors TR2 and TR3 drive emitter follower stages $EF_1$ and $EF_2$ respectively which drive gate oscillators $GO_1$ and $GO_2$ respectively and commutation circuits $CC_1$ and $CC_2$ respectively.

The gate oscillator $GO_1$ consists of a conventional astable multivibrator circuits $AS_1$, one output of which drives an emitter follower stage $EF_3$ which in turn drives the primary coil of a gate transformer $GT_1$.

The gate transformer $GT_1$ has four secondary coils $S_{a1}$ $S_{a2}$ $S_{b1}$ $S_{b2}$ which are connected to the silicon controlled rectifiers $D_{a1}$ $D_{a2}$ $D_{b1}$ $D_{b2}$ as shown in FIG. 5. The gate oscillator $GO_2$ has a similar astable multivibrator $AS_2$ and a gate transfomer $GT_2$ which has four secondary coils $S_{c1}$ $S_{c2}$ $S_{d1}$ $S_{d2}$ connected to the silicon controlled rectifiers $D_{c1}$ $D_{c2}$ $D_{d1}$ $D_{d2}$ as shown in FIG. 5.

The commutation circuit $CC_1$ is powered from a dc supply $V_1$ and contains a thyristor $TH_1$ and a commutation transformer $CT_1$ which has a gapped core and four secondary coils $T_1$ $T_2$ $T_3$ $T_4$. The four secondary coils $T_1$ $T_2$ $T_3$ $T_4$ are connected to the silicon controlled rectifiers $D_{a1}$ $D_{a2}$ $D_{b1}$ $D_{b2}$ as shown in FIG. 5. The thyristor $TH_1$ is wired in series with the primary coil of the transformer $CT_1$ and this series combination is wired in parallel with a capacitor $CA_1$. A capacitor $CB_1$ is connected between the gate of the thyristor $TH_1$ and the emitter follower stage $EF_1$ and a resistor $RL_1$ is connected between the gate and the cathode of the thyristor $TH_1$. The commutation circuit $CC_2$ is similarly constructed. The supplies $V_1$ and $V_2$ are common.

In operation, when no "spike" is provided from the unijunction transistor circuit and the monostable multivibrator MS is in its stable state, the emitter follower stage $EF_1$ is on and the astable multivibrator $AS_1$ is oscillating, providing a series of pulses at 1–2 kc/s via the secondary coils $S_{a1}$ $S_{a2}$ $S_{b1}$ $S_{b2}$ to maintain the silicon controlled rectifiers $D_{a1}$ $D_{a2}$ $D_{b1}$ $D_{b2}$ in a conducting state. The emitter follower stage $EF_2$ is off, the astable multivibrator $AS_2$ is not able to oscillate and the silicon controlled ectifiers $D_{c1}$ $D_{c2}$ $D_{d1}$ $D_{d2}$ are unable to conduct. In this mode the output from the terminals A and B (FIg. 5) of the bridge network follows the single-phase sine wave. When a "spike" is provided by the unijunction transistor circuit, the monostable multivibrator MS changes to its stable state with the emitter follower stage $EF_1$ off and the emitter follower stage $EF_2$ on. As $EF_1$ switches off, it transmits a positive pulse via the capacitor $CB_1$ to the gate of the thyristor $TH_1$ which switches on to allow the capacitor $CA_1$ to discharge through the primary coil of the transformer $CT_1$. The discharge o the capacitor $CA_1$ is communicated via the secondary coils $T_1$ $T_2$ $T_3$ $T_4$ to the bridge network and switches off the silicon controlled rectifiers $D_{a1}$ $D_{a2}$ $D_{b1}$ $D_{b2}$. When $EF_2$ switches on, the astable multivibrator $AS_2$ is able to oscillate and the silicon controlled rectifiers $D_{c1}$ $D_{c2}$ $D_{d1}$ $D_{d2}$ switch on and remain in a conducting state until the monostable MS returns to its stable state at the half-wave point of the single-phase 1. During the period that the monostable multivibrator MS is in its stable state, the output from the terminals A and B of the bridge network is the single-phase sine wave 1 with its polarity reversed.

When the monostable multivibrator MS returns to its stable state, $EF_2$ switches off and transmits a positive pulse via the capacitor $CB_2$ to the gate of the thyristor $TH_2$ which switches on to allow the capacitor $CA_2$ to discharge through the primary coil of the transformer $CT_2$. The discharge of the capacitor $CA_2$ is communicated via the secondary coils $T_4$ T hd 6 $T_7$ $T_8$ to the bridge network and switches off the silicon controlled rectifiers $D_{c1}$ $D_{c2}$ $D_{d1}$ $D_{d2}$. $EF_1$ switches on, causing the astable multivibrator $AS_1$ to oscillate, and the silicon controlled rectifiers $D_{a1}$ $D_{a2}$ $D_{b1}$ $D_{b2}$ switch on once again.

The monostable multivibrator MS remains in a stable state until the next "spike" arrives from the unijunction transistor circuit to trigger it to its unstable state once again. An output voltage from the terminals A and B of the bridge network is obtained which is similar to that shown in FIG. 2.

FIG. 8 shows a filter suitable for use in eliminating unwanted harmonics from a phase-shifted output waveform such as is shown in FIG. 2. The filter comprises three inductors $L_1$ $L_2$ $L_3$ and three capacitors $C_4$ $C_5$ $C_6$ and the values of these components may be chosen according to the frequency of the fundamental component of the output waveform. A filter which presents an infinite impedance to 3rd 5th and 7th harmonics of a 60 Hz single-phase supply would have the following component values: $L_1 = 50mH$; $L_2 = 147.3mH$; $L_3 = 178.4mH$; $C_4 = 7.352uF$; $C_5 = 2.985uF$; $C_6 = 1.096uF$.

In FIG. 9, a single-phase 11 is connected across one pair of opposite terminals 13 and 14 of a bridge network 12 and the other pair of opposite terminals 15 and 16 are connected to a load 17. Each arm of the bridge network 12 contains a sub-network 18 comprising four diodes 19, 20, 21, 22 disposed in a bridge rectifier configuration and a transistor 23 connected across the rectifier bridge. The diode 19, 20, 21, 22 are so connected that when the transistor 23 is in a non-conducting state, no current can flow in the arm of the bridge, and when the transistor 23 is in a conducting state, current can flow in either direction in the arm of the bridge. Each transistor 23 is switched by a bistable multivibrator BS and the four bistables $BS_1$ $BS_2$ $BS_3$ $BS_4$ are controlled by a master timer MT. The master timer MT is programmed to control the bistables BS in such a manner that the output voltage waveform across the load 17 is similar to that illustrated in FIG. 2.

I claim:

1. Apparatus for converting an alternating current power supply having a single phase of given period to a power supply having a plurality of phases, said apparatus comprising an electrical bridge network having an input connected to said single phase, an output, and four arms each of which contains at least one switch device, and external switch circuitry for controlling the said switch devices, the four arms of said bridge network comprising two pairs of opposite arms each of which is selectively capable of forming a conducting path between said input and said output under the control of said external switch circuitry, said external switch circuitry being operative to switch the switch devices contained in each pair of opposite arms from a nonconducting state to a conducting state and from a conducting state to a nonconducting state at least once during every half period of said single phase to provide at said output a voltage waveform which contains a fundamental component of the said single phase which is out of phase with the single phase by a predetermined phase angle.

2. Apparatus according to claim 1 wherein the said single phase has a periodic sinusoidal waveform and the said voltage waveform at said output of the bridge network is a cyclic waveform of period equal to the period of the sinusoidal waveform, a predetermined portion of each half cycle of said voltage waveform being of the form of the corresponding portion of the half-cycle of the said sinusoidal waveform and the remaining portion of each half-cycle of said voltage waveform being of the form of the negative of the corresponding remaining portion of the half-cycle of the said sinusoidal waveform.

3. Apparatus according to claim 1 wherein each said switch device is a semiconductor switch device.

4. Apparatus according to claim 3 wherein the semiconductor switch device is a silicon controlled rectifier.

5. Apparatus according to claim 3 wherein the semiconductor switch device is a triac.

6. Apparatus according to claim 1 wherein the switch device in each of the said four arms of the electrical bridge network comprises two silicon controlled rectifiers connected in a parallel back to back configuration.

7. Apparatus according to claim 1 wherein each of the said four arms contains an electrical sub-network consisting of four diodes arranged as a bridge rectifier having an input pair of opposite terminals and an output pair of opposite terminals, the input pair of opposite terminals being connected to the said arm and the output pair of opposite terminals being connected to the said switch device in said arm.

8. Apparatus according to claim 7 wherein the said switch device is a transistor.

9. Apparatus according to claim 8 wherein the said transistor is switched by a bistable multivibrator.

10. Apparatus according to claim 1 wherein the voltage waveform at the said output also contains haromonic components of the said single phase and wherein a filter is connected to the said output to reduce the said harmonic components.

11. A motor drive system having a multi-phase electric motor driven from a single phase power supply using apparatus according to claim 1.

* * * * *